(12) United States Patent
Liu et al.

(10) Patent No.: US 12,509,634 B2
(45) Date of Patent: *Dec. 30, 2025

(54) CARBON SEQUESTRATION FOAMED LIGHTWEIGHT SOIL AND PREPARATION METHOD THEREOF

(71) Applicant: SOUTHEAST UNIVERSITY, Nanjing (CN)

(72) Inventors: Songyu Liu, Nanjing (CN); Xiang Zhang, Nanjing (CN); Guanghua Cai, Nanjing (CN); Ying Zhang, Nanjing (CN); Yitong Li, Nanjing (CN); Yizhao Liu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 108 days.

This patent is subject to a terminal disclaimer.

(21) Appl. No.: 17/909,718

(22) PCT Filed: Feb. 15, 2022

(86) PCT No.: PCT/CN2022/076267
§ 371 (c)(1),
(2) Date: Apr. 20, 2023

(87) PCT Pub. No.: WO2023/060812
PCT Pub. Date: Apr. 20, 2023

(65) Prior Publication Data
US 2024/0209261 A1    Jun. 27, 2024

(30) Foreign Application Priority Data

Oct. 15, 2021   (CN) .......................... 202111202972.5

(51) Int. Cl.
| | | |
|---|---|---|
| *C09K 17/10* | (2006.01) | |
| *C04B 14/10* | (2006.01) | |
| *C04B 28/10* | (2006.01) | |
| *C04B 38/10* | (2006.01) | |
| *C04B 103/40* | (2006.01) | |
| *C04B 111/00* | (2006.01) | |
| *C04B 111/40* | (2006.01) | |

(52) U.S. Cl.
CPC .............. *C09K 17/10* (2013.01); *C04B 14/10* (2013.01); *C04B 28/105* (2013.01); *C04B 38/103* (2013.01); *C04B 2103/402* (2013.01); *C04B 2111/00017* (2013.01); *C04B 2111/40* (2013.01)

(58) Field of Classification Search
CPC ..... C04B 14/10; C04B 28/105; C04B 38/103; C04B 2103/402; C04B 2111/00017; C04B 2111/40; C04B 38/106; C04B 28/10; C09K 17/10

See application file for complete search history.

(56) References Cited

U.S. PATENT DOCUMENTS 12,258,296 B1 * 3/2025 Liu ........................ C04B 24/123

FOREIGN PATENT DOCUMENTS

CN        113087457 A * 7/2021 ........... C04B 38/106

OTHER PUBLICATIONS

Cai Guanghua et al "Preliminary Investigation on Reinforcement of Soft Soil Based on the Method of Carbonation by Carbon Dioxide Foams", Chinese Journal of Underground Space and Engineering, 11, supplement 1, pp. 34-38 (Year: 2015).*

* cited by examiner

*Primary Examiner* — Anthony J Green
(74) *Attorney, Agent, or Firm* — CBM PATENT CONSULTING, LLC

(57) ABSTRACT

The present application belongs to the technical field of civil and architectural engineering materials, and in particular relates to an environmental and low-carbon foamed lightweight soil prepared by using $CO_2$ and MgO as raw materials. Raw material compositions of the carbon sequestration foamed lightweight soil include, in parts by weight, 10 to 200 parts of MgO, 10 to 100 parts of a filler, 2 to 45 parts of a $CO_2$ bubble cluster and 20 to 400 parts of water. The present application is made in view of the problems of large carbon emission and serious energy consumption caused by a cement solidification agent used in traditional foamed lightweight soil.

7 Claims, 2 Drawing Sheets

CARBON SEQUESTRATION FOAMED LIGHTWEIGHT SOIL AND PREPARATION METHOD THEREOF

RELATED APPLICATION

The present application claims the priority of the Chinese patent application filed to the Chinese Patent Office on Oct. 15, 2021 with the application number 2021112029725 and titled "Carbonized Foamed Light Soil and Preparation Method Thereof", and the entire contents thereof are incorporated by reference in the present application.

TECHNICAL FIELD

The present application relates to the technical field of civil and architectural engineering materials, in particular to an environmental carbon sequestration foamed lightweight soil prepared by using carbon dioxide ($CO_2$) and magnesium oxide (MgO) as raw materials and a preparation method thereof.

BACKGROUND

The existing foamed lightweight soil is an inorganic synthetic material formed by fully stirring micro-bubble clusters generated by physical, chemical or biological foaming agents, main solidification agents (such as cement-based cementing materials), auxiliary solidification agents (such as gypsum powder, silica powder, fly ash), water, admixtures (such as early strength agents, water reducing agents), etc. according to a specific proportion and coagulating them through a series of physical and chemical actions. Because the size and number of closed bubbles formed inside soil bodies can be controlled to a certain extent, the foamed lightweight soil has the advantages of strong adjustability of bulk density, strong adjustability of strength, high fluidity, good heat insulation and sound insulation effects, good freeze-thaw resistance and the like. Therefore, in recent years, the foamed lightweight soil has been used in abutment back backfill, road widening, bridge span reduction, steep slope embankments, landslide subgrades, soft soil subgrade load reduction, underground structure load reduction and other projects. However, traditional foamed lightweight soils mostly use cement as a solidification agent. This method has the disadvantages of high cost, high energy consumption and large pollution, which does not conform to the principle of green and environmental protection, and the strength of cement soil increases slowly and the curing time is long, therefore, there are certain limitations in practical engineering applications.

Based on the advantages of low calcination temperature, absorption of a large amount of $CO_2$, high strength and good durability of MgO cement, it is proposed to apply a MgO carbonization technology to the soil, and in-depth study has found that the strength of MgO carbonized solidified soil increases with the increase of carbonization time, generally, carbonization for 3 to 6 hours can reach the strength of the cement soil for 28 days; the permeability of the carbonized solidified soil is in the same order of magnitude as that of the cement soil; the carbonized solidified soil has better freeze-thaw cycle resistance and stronger ability to resist sulfate attack, etc., than the cement soil.

Existing carbon sequestration technologies are mainly divided into biological carbon sequestration and physical carbon sequestration, and they both increase carbon absorption and storage capacity by certain means and reduce the concentration of $CO_2$ in the atmosphere.

SUMMARY

Respective exemplary examples of the present application provide a carbon sequestration foamed lightweight soil and a preparation method thereof. The method uses MgO as a cementing material, which has the characteristics of high construction efficiency, reliable quality, low carbon and environmental protection compared with traditional cement, and meets the needs of $CO_2$ resource utilization, and is in line with the development trend of green construction in civil engineering.

Respective examples of the present application provide a carbon sequestration foamed lightweight soil, which include, according to a raw material ratio, 10 to 200 parts of MgO, 10 to 100 parts of a filler, 2 to 45 parts of a $CO_2$ bubble cluster and 20 to 400 parts of an aqueous solution, wherein the raw material ratio is in parts by weight.

In one example, the MgO is a mixture or one of light MgO or heavy MgO.

In one example, the filler includes a raw material soil, and the raw material soil may be an engineering waste soil, a sandy soil, a silt or a clay soil.

In one example, the raw material soil is air-dried and ground down to pass through a 2 mm sieve. For the raw material soil that does not meet requirements, desliming and necessary screening treatment shall be carried out in advance.

In one example, producing materials of $CO_2$ bubble cluster include, in parts by weight, 0.33 to 20 parts of a foaming agent, 0.0033 to 2 parts of a foam stabilizer and 0.0033 to 2 parts of an active agent. In particular, a foaming agent used for the $CO_2$ bubble cluster is any one or a mixture of more of a rosin resin foaming agent (such as rosin soap foaming agents, etc.), a synthetic surface active foaming agent (such as sodium lauryl alcohol ether sulfate, sodium dodecyl benzene sulfonate, etc), a protein foaming agent (such as vegetable protein and animal protein foaming agents) and a composite foaming agent (such as plant-derived composite foaming agents, etc.). The foam stabilizer includes, but is not limited to, cellulose ether, lauryl alcohol, triethanolamine, calcium stearate, etc. The bubble cluster is prepared by adopting a pre-foaming method and introducing high-purity $CO_2$ with an air compressor. The active agent is sodium cocoyl glycinate, potassium cocoyl glycinate, sodium lauroyl glutamate or potassium cocoyl glutamate.

In one example, the aqueous solution is tap water, purified water or distilled water, including water used for the $CO_2$ bubble cluster.

Respective examples of the present application further provide a method for preparing the carbon sequestration foamed lightweight soil as described in the above examples, including the following steps:

S1. preparation of raw materials, including preparing and weighing 10 to 100 parts of MgO, 10 to 100 parts of a filler, and 20 to 400 parts of an aqueous solution;

S2. preparation of a slurry, including putting the MgO and the filler prepared in the Step S1 into a stirring device, conducting stirring at a rotation speed of 100 r/min for 1 to 2 minutes so that the MgO and the filler are mixed evenly to obtain a mixture, adding the aqueous solution into the mixture in 2 or 3 portions respectively, conducting stirring for 1 to 2 minutes after one portion of the aqueous solution is added each time, and keeping powder from sinking to the bottom and agglomeration to ensure that the slurry is uniform and free of deposition until the aqueous solution is added completely, so as to obtain the slurry;

S3. preparation of a $CO_2$ bubble cluster, including preparing the $CO_2$ bubble cluster with high-pressure $CO_2$ by using a pre-foaming method, wherein the high-pressure $CO_2$ is industrial high-purity $CO_2$ or industrial waste gas purified $CO_2$;

S4. mixing under stirring, including adding 2 to 45 parts of the $CO_2$ bubble cluster into the slurry obtained in the Step S2 and conducting stirring at a speed of 600 to 900 r/min for a time of 10 to 12 minutes, and ensuring that the $CO_2$ bubble cluster is evenly distributed in the slurry and the slurry is free of deposition so as to obtain a mixed paste; and S5. sample preparation and curing, including immediately pouring the mixed paste obtained in the Step S4 into a mold, conducting sealing, and conducting curing in a constant-temperature curing chamber to obtain the foamed lightweight soil.

In one example, in the Step S3, a preparation method of the $CO_2$ bubble cluster includes the following steps:

diluting a foaming agent of the $CO_2$ bubble cluster according to a dilution multiple of 20 to 60 times, controlling an active agent in a ratio of 1% to 10% of the foaming agent (i.e., controlling the active agent in 0.33 to 20 parts by weight of the foaming agent), and conducting mixing to obtain a foaming liquid; connecting the foaming liquid to a $CO_2$ high-pressure tank through an air pipe, opening a ventilation valve of the $CO_2$ high-pressure tank and adjusting a pressure to 200 kPa; after an air in a foaming liquid pipeline is exhausted and the foaming liquid completely enters a water pump, closing the ventilation valve after a pressure and a foaming rate of the foaming device are stable; opening a foaming valve, controlling a pressure range to be within 0.1 to 0.4 mpa, a specific speed of the water pump to be between 20 and 80 and a corresponding water pump flow to be 1 to 4 L/min so as to discharge fine and stable $CO_2$ foam, and receiving the $CO_2$ foam with a container so as to obtain the $CO_2$ bubble cluster.

In one example, in the Steps S4 to S5, the sample preparation needs to be completed within a half-life of the foaming agent of the $CO_2$ bubble cluster to prevent the foam from bursting to cause leakage of $CO_2$.

Beneficial Effects

In view of the problems of large carbon emission and serious energy consumption caused by a cement solidification agent used in traditional foamed lightweight soil, the present application aims to propose a novel operation method of a carbon sequestration foamed mixture lightweight soil, promote transformation of a foundation treatment technology from high pollution and high energy consumption to low carbon, environmental protection and sustainability, promote carbon absorption and storage while reducing $CO_2$ emission, and select a method of preparing lightweight soil by using MgO as a solidification agent and $CO_2$ gas as a raw material for bubbles.

In the present application, the MgO is selected instead of traditional Portland cement, and the amount of cement is reduced, so that the huge energy consumption in the cement production process and the discharge of a large amount of toxic substances such as $CO_2$, $SO_2$ and dust are reduced, and environmental pollution is reduced. In the processes of sample preparation and curing of the lightweight soil, a large amount of greenhouse gas $CO_2$ is used, which provides new ideas for reducing carbon emissions and enhances carbon absorption and storage effects; and compared with traditional cement foamed mixture lightweight soils, preparation can be completed in a short time, with the characteristics of energy saving, environmental protection, low carbon and high efficiency, which meets requirements of sustainable development for modern engineering construction.

The traditional cement foamed mixture lightweight soils generally produce relatively large shrinkage, and release a lot of heat, which increases the inner and surface temperature difference of the foamed lightweight soils. The superposition of temperature stress and autogenous shrinkage will significantly increase the cracking risk of an engineering structure. In the present application, the MgO used for the carbon sequestration foam (i.e., carbonized foam) lightweight soil itself has dilatability and can effectively reduce the autogenous shrinkage of the foamed lightweight soil.

The carbon sequestration foamed lightweight soil prepared by the present application has low density and light weight, reduces the load of buildings, can be applied to special high-demand projects, and improves project safety. A pH value of the carbon sequestration foamed lightweight soil is between 10.22 and 10.83, which is much lower than that of corresponding cement-solidified soils (a pH value >11.5), will not cause alkali pollution to the environment and has a good ecological effect.

DETAILED DESCRIPTION OF THE EMBODIMENTS

In order to make the present application better understood, the content of the present application is further illustrated below in combination with examples, but the present application is not limited to the following examples. It should be understood that the specific examples described herein are only used to explain the present application, but not to limit the present application.

Figure 1:
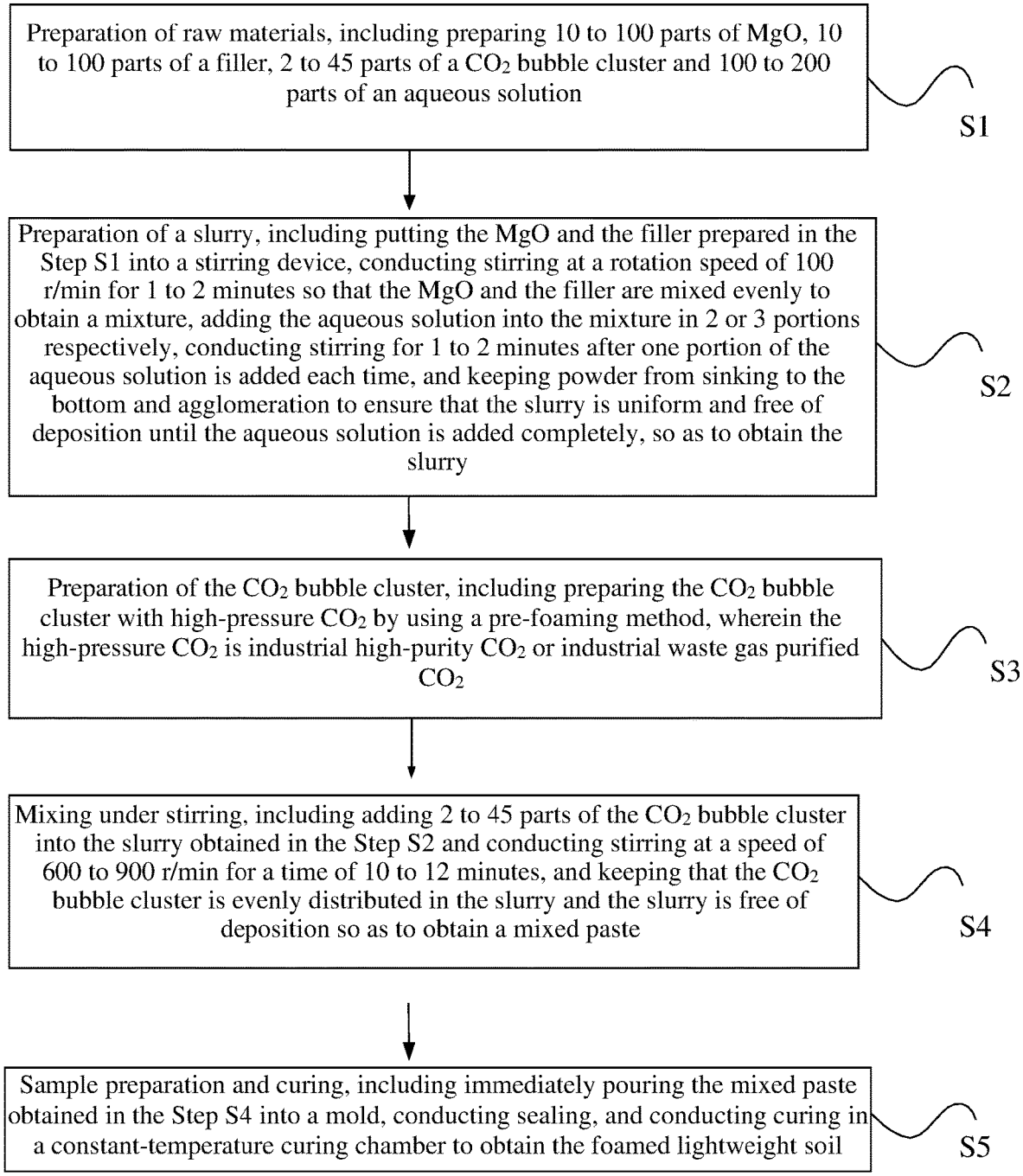
FIG. 1 is a flow diagram of a preparation method of a carbon sequestration foamed lightweight soil in one example of the present application.
Figure 2:
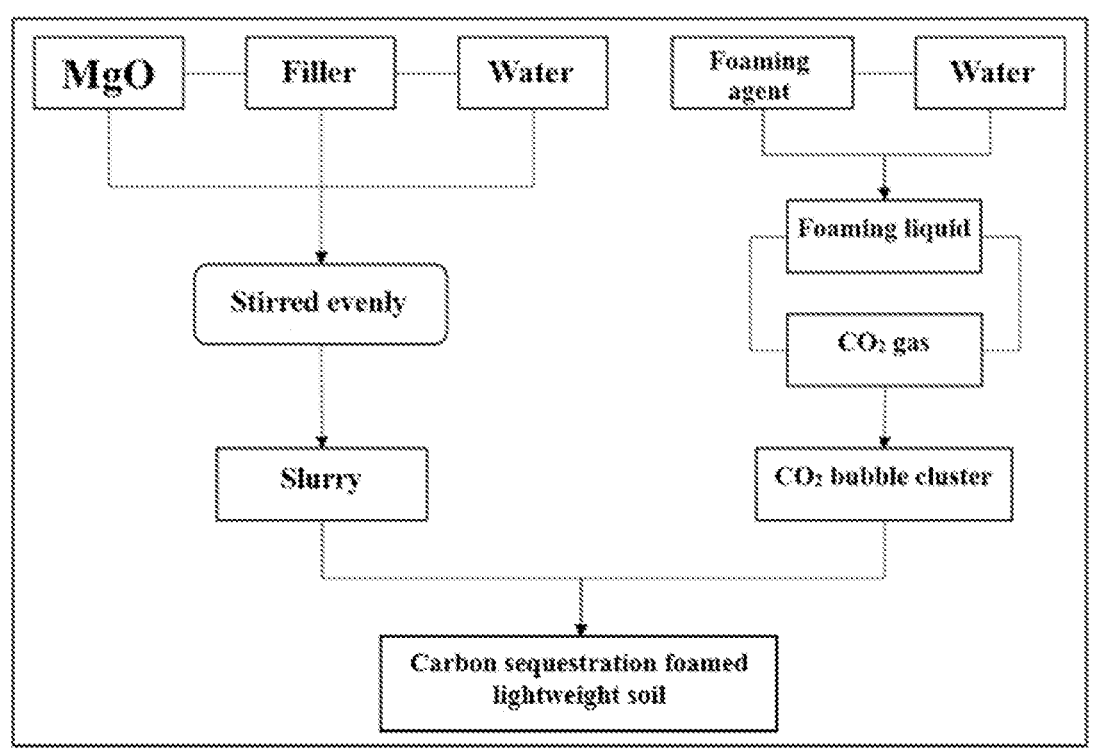
FIG. 2 is a schematic diagram of a preparation method of a carbon sequestration foamed lightweight soil in one example of the present application.

FIG. 1 shows a flow diagram of a preparation method of a carbon sequestration foamed lightweight soil in one example of the present application. The preparation method includes the following steps.

S1. Preparation of raw materials, including preparing 10 to 100 parts of MgO, 10 to 100 parts of a filler, 2 to 45 parts of a $CO_2$ bubble cluster and 100 to 200 parts of an aqueous solution.

S2. Preparation of a slurry, including putting the MgO and the filler prepared in the Step S1 into a stirring device, conducting stirring at a rotation speed of 100 r/min for 1 to 2 minutes so that the MgO and the filler are mixed evenly to obtain a mixture, adding the aqueous solution into the mixture in 2 or 3 portions respectively, conducting stirring for 1 to 2 minutes after one portion of the aqueous solution is added each time, and during the stirring, paying attention that powder cannot sink to the bottom or agglomerate to ensure that the slurry is uniform and free of deposition until the aqueous solution is added completely, so as to obtain the slurry.

S3. Preparation of the $CO_2$ bubble cluster, including preparing the $CO_2$ bubble cluster with high-pressure $CO_2$ by using a pre-foaming method, wherein the high-pressure $CO_2$ is industrial high-purity $CO_2$ or industrial waste gas purified $CO_2$.

The pre-foaming method in the examples includes the following steps: firstly mixing a base material (a raw material soil), a solidifying material (MgO) and water evenly, conducting mixing to form a raw material soil slurry, and then foaming a foaming agent solution by a foaming device; then, stirring the raw soil slurry and air bubbles evenly to obtain a bubble lightweight soil slurry body; and then, pouring the mixed slurry into a mold and conducting curing forming to form a lightweight soil.

S4. Mixing under stirring, including adding 2 to 45 parts of the $CO_2$ bubble cluster into the slurry obtained in the Step S2 and conducting stirring at a speed of 600 to 900 r/min for a time of 10 to 12 minutes, and ensuring that the $CO_2$ bubble cluster is evenly distributed in the slurry and the slurry is free of deposition so as to obtain a mixed paste.

S5. Sample preparation and curing, including immediately pouring the mixed paste obtained in the Step S4 into a mold, conducting sealing, and conducting curing in a constant-temperature curing chamber to obtain the foamed lightweight soil.

Example 1

A carbon sequestration foamed lightweight soil was provided. Each cubic meter of the carbon sequestration foamed lightweight soil included: 100 parts of reactive MgO powder, 100 parts of a silty clay, 10 parts of a $CO_2$ bubble cluster and 200 parts of water. The silty clay needed to be air-dried before being ground down to pass through a 2 mm sieve. The water used was tap water, including water used for the $CO_2$ bubble cluster.

Sodium dodecyl benzene sulfonate was selected as a foaming agent, which was diluted according to a dilution multiple of 40 times. The dosage of sodium cocoyl glycinate was controlled to be 3% of the foaming agent. Mixing was conducted to obtain a foaming liquid, a foaming rate thereof was 20 times, and a half-life thereof was 20 to 40 minutes.

TABLE 1

Main physical and chemical indexes of silty clay

| Test items | Test values |
| --- | --- |
| Natural density $\rho/(g \cdot cm^{-3})$ | 1.88 |
| Natural moisture content, w/% | 33.3 |
| Maximum dry density/$(g \cdot cm^{-3})$ | 1.72 |
| Optimum moisture content/% | 17.4 |
| Liquid limit, $w_L$ (%) | 43 |
| Plastic limit, $w_p$ (%) | 22.5 |
| Specific gravity, $G_s$ | 2.75 |
| pH value | 8.30 |

TABLE 2

Main chemical compositions of silty clay and MgO

| Compositions | MgO | $Al_2O_3$ | CaO | $SiO_2$ | $Fe_2O_3$ | $Na_2O$ | Loss on ignition |
| --- | --- | --- | --- | --- | --- | --- | --- |
| Silty clay | 2.18 | 11.9 | 5.57 | 62.5 | 3.3 | 1.28 | 10 |
| MgO | 95.5 | 0.24 | 1.05 | 1.02 | 0.18 | 0.023 | 1.68 |

The carbon sequestration foamed lightweight soil was prepared by the following steps:
   S1. preparation of raw materials: 100 parts of the reactive MgO powder and 100 parts of the silty clay are weighed for standby;
   S2. slurry preparation: the MgO and the silty clay were put into a stirring device according to a proportion, and stirring was conducted at a rotation speed of 100 r/min for 2 minutes, so that the MgO and the silty clay were mixed evenly;
   S3. preparation of the $CO_2$ bubble cluster: the foaming agent was mixed with the water at a dilution multiple of 40 times, the dosage of the sodium cocoyl glycinate active agent was controlled to be in 0.15 part, the dosage of a lauryl alcohol foam stabilizer was controlled to be in 0.05 part, mixing was conducted to obtain a foaming liquid, which was then connected to a $CO_2$ high-pressure tank through an air pipe, a $CO_2$ ventilation valve was opened and a pressure was adjusted to 200 kPa, and after an air in a foaming liquid pipeline was exhausted and the foaming liquid completely entered a water pump, the $CO_2$ ventilation valve was closed after a pressure and a foaming rate of the foaming device were stable. Then, a foaming valve was opened, a pressure of 0.2 mpa, a water pump specific speed of 60 and a water pump flow of 3 L/min were selected, fine and stable $CO_2$ foam was discharged, and the $CO_2$ foam was received with a container for standby;
   S4. mixing under stirring: 10 parts of the $CO_2$ bubble cluster was added into the slurry and stirred at a speed of 800 r/min for a time of 10 minutes, so as to ensure that the $CO_2$ bubble cluster was evenly distributed and the slurry was free of deposition, thereby a mixed paste was obtained; and
   S5. sample preparation and curing: the mixed paste was immediately poured into a mold, and curing was conducted for 7 days in a constant-temperature curing chamber to obtain the foamed lightweight soil. From the Steps S4 to S5, the sample preparation needed to be completed within a half-life of the foaming agent to prevent the foam from bursting to cause leakage of $CO_2$.

Example 2

A carbon sequestration foamed lightweight soil was provided. Each cubic meter of the carbon sequestration foamed lightweight soil included: 100 parts of reactive MgO powder, 100 parts of a silty clay, 10 parts of a $CO_2$ bubble cluster and 200 parts of water. The same silty clay, MgO, water and foaming agent were used as in Example 1, and treatment methods for various materials were also kept the same.

A preparation method of the carbon sequestration foamed lightweight soil in Example 2 was the same as that in Example 1, and a curing time thereof was 1 day.

Comparative Example 1

A carbon sequestration foamed lightweight soil was provided. Each cubic meter of the carbon sequestration foamed lightweight soil included: 100 parts of reactive MgO powder, 100 parts of a silty clay, 20 parts of a CO$_2$ bubble cluster and 200 parts of water. The same silty clay, MgO, water and foaming agent were used as in Example 1, and treatment methods for various materials were also kept the same.

A preparation method of the carbon sequestration foamed lightweight soil in Comparative Example 1 was the same as that in Example 1, and a curing time thereof was 7 days.

Comparative Example 2

A carbon sequestration foamed lightweight soil was provided. Each cubic meter of the carbon sequestration foamed lightweight soil included: 90 parts of reactive MgO powder, 100 parts of a silty clay, 10 parts of a CO$_2$ bubble cluster and 200 parts of water. The same silty clay, MgO, water and foaming agent were used as in Example 1, and treatment methods for various materials were also kept the same.

A preparation method of the carbon sequestration foamed lightweight soil in Comparative Example 2 was the same as that in Example 1, and a curing time thereof was 7 days.

Comparative Example 3

A carbon sequestration foamed lightweight soil was provided. Each cubic meter of the carbon sequestration foamed lightweight soil included: 100 parts of reactive MgO powder, 100 parts of a silty clay, 10 parts of a CO$_2$ bubble cluster and 200 parts of water. The same silty clay, MgO, water and foaming agent were used as in Example 1, and treatment methods for various materials were also kept the same.

A preparation method of the carbon sequestration foamed lightweight soil in Comparative Example 3 was the same as that in Example 1, and a curing time thereof was 3 days.

Test Detection

Carbon sequestration foamed lightweight soil samples prepared in Examples 1, 2 and Comparative Examples 1, 2, and 3 were tested for unconfined compressive strength and soil pH values. The test for unconfined compressive strength was carried out in accordance with the specification "Test Methods of Soils for Highway Engineering JTG E40-2007" by using a CBR-2 bearing ratio tester. A pH value of a solidified soil was measured according to ASTM Standard Test Method for pH of Soils D4972-13 by using a Shanghai Lei Ci PHS-3C PH meter.

Test Results

TABLE 3

Properties of carbon sequestration foamed lightweight soil

| Samples | MgO content | CO$_2$ bubble cluster | Curing time | Unconfined compressive strength (KPa) | Soil pH value |
|---|---|---|---|---|---|
| Example 1 | 100% | 10% | 7 d | 250.1 | 10.39 |
| Example 2 | 100% | 10% | 1 d | 66.2 | 10.83 |
| Comparative Example 1 | 100% | 20% | 7 d | 172.1 | 10.22 |
| Comparative Example 2 | 90% | 10% | 7 d | 193.2 | 10.25 |
| Comparative Example 3 | 100% | 10% | 3 d | 119.3 | 10.48 |

Strength Index

It can be seen from Table 3 that: through Example 1 and Comparative Example 1, the increase in the usage amount of the CO$_2$ bubble cluster will reduce the strength of the carbon sequestration foamed lightweight soil, and when the content of the CO$_2$ bubble cluster is increased from 10% to 20%, the 7d strength of the carbon sequestration foamed lightweight soil can be reduced by 19.86%.

Through Example 1 and Comparative Example 2, the higher the MgO content, the higher the strength of the carbon sequestration foamed lightweight soil, and when the MgO content is increased from 90% to 100%, the 7d strength of the carbon sequestration foamed lightweight soil is increased by 8.92%.

Through Examples 1, 2 and Comparative Example 3, the 1d strength, 3d strength and 7d strength of the carbon sequestration foamed lightweight soil corresponding to the 100% MgO and 20% CO$_2$ bubble cluster contents are 66.2 KPa, 119.3 KPa, and 250.1 KPa, respectively, the strength of the carbon sequestration foamed lightweight soil increases with age, and increases most rapidly in the first 3d, and the strength increases relatively rapidly.

Acid-Base Properties

A pH value of the carbon sequestration foamed lightweight soil is about 10.5, which is much lower than that (>11.5) of corresponding cement-solidified soils, will not cause alkali pollution to the environment and has a good ecological effect.

Through Example 1 and Comparative Example 1, the increase in the usage amount of the CO$_2$ bubble cluster will reduce the pH value of the carbon sequestration foamed lightweight soil, and when the content of the CO$_2$ bubble cluster is increased from 10% to 20%, the pH value of the carbon sequestration foamed lightweight soil can be reduced from 10.39 to 10.22.

Through Example 1 and Comparative Example 2, it is found that the higher the MgO content, the higher the pH value of the carbon sequestration foamed lightweight soil, and when the MgO content is increased from 90% to 100%, the pH value of the carbon sequestration foamed lightweight soil can be increased from 10.25 to 10.35.

Through Examples 1, 2 and Comparative Example 3, the 1d pH value, 3d pH value and 7d pH value of the carbon sequestration foamed lightweight soil corresponding to the 100% MgO and 10% CO$_2$ bubble cluster contents are 10.83, 10.48, and 10.39, respectively, and the pH value of the carbon sequestration foamed lightweight soil gradually decreases with age, and has the largest decrease in the first 3d.

Finally, the method of the present application is only a preferred embodiment, and is not intended to limit the protection scope of the present application. Any modification, equivalent replacement, improvement, etc., made within the spirit and principle of the present application should be included in the scope of protection of the present application.

What is claimed is:

1. A carbon sequestration foamed lightweight soil, comprising, according to a raw material ratio, 10 to 200 parts of MgO, 10 to 100 parts of a filler, 2 to 45 parts of a CO$_2$ bubble cluster and 20 to 400 parts of an aqueous solution, wherein the raw material ratio is in parts by weight.

2. The carbon sequestration foamed lightweight soil according to claim 1, wherein the MgO is a mixture or one of light MgO or heavy MgO.

3. The carbon sequestration foamed lightweight soil according to claim 1, wherein the filler comprises a raw material soil, and the raw material soil is an engineering waste soil, a sandy soil, a silt or a clay soil.

4. The carbon sequestration foamed lightweight soil according to claim 1, wherein producing materials of the CO$_2$ bubble cluster comprise, in parts by weight, 0.33 to 20 parts of a foaming agent, 0.0033 to 2 parts of a foam stabilizer and 0.0033 to 2 parts of an active agent,
  wherein the foaming agent is one or a mixture of more of a rosin resin foaming agent, a synthetic surface active foaming agent, a protein foaming agent and a composite foaming agent; the foam stabilizer is cellulose ether, lauryl alcohol, triethanolamine or calcium stearate; and the active agent is sodium cocoyl glycinate, potassium cocoyl glycinate, sodium lauroyl glutamate or potassium cocoyl glutamate.

5. A method for preparing the carbon sequestration foamed lightweight soil according to claim 1, comprising the following steps:
  Step S1 preparation of raw materials, comprising preparing 10 to 100 parts of MgO, 10 to 100 parts of a filler, and 100 to 200 parts of an aqueous solution;
  Step S2 preparation of a slurry, comprising putting the MgO and the filler prepared in the Step S1 into a stirring device, conducting stirring at a rotation speed of 100 r/min for 1 to 2 minutes so that the MgO and the filler are mixed evenly to obtain a mixture, adding the aqueous solution into the mixture in 2 or 3 portions respectively, conducting stirring for 1 to 2 minutes after one portion of the aqueous solution is added each time, and keeping powder from sinking to the bottom and agglomeration to ensure that the slurry is uniform and free of deposition until the aqueous solution is added completely, so as to obtain the slurry;
  Step S3 preparation of a $CO_2$ bubble cluster, comprising preparing the $CO_2$ bubble cluster with high-pressure $CO_2$ by using a pre-foaming method, wherein the high-pressure $CO_2$ is industrial high-purity $CO_2$ or industrial waste gas purified $CO_2$;
  Step S4 mixing under stirring, comprising adding 2 to 45 parts of the $CO_2$ bubble cluster into the slurry obtained in the Step S2 and conducting stirring at a speed of 600 to 900 r/min for a time of 10 to 12 minutes, and keeping that the $CO_2$ bubble cluster is evenly distributed in the slurry and the slurry is free of deposition so as to obtain a mixed paste; and
  Step S5 sample preparation and curing, comprising immediately pouring the mixed paste obtained in the Step S4 into a mold, conducting sealing, and conducting curing in a constant-temperature curing chamber to obtain the foamed lightweight soil.

6. The method according to claim 5, wherein in Step S3, the preparation of the $CO_2$ bubble cluster comprises the following steps:
  diluting a foaming agent of the $CO_2$ bubble cluster according to a dilution multiple of 20 to 60 times, controlling an active agent in a ratio of 1% to 10% of the foaming agent, and conducting mixing to obtain a foaming liquid;
  connecting the foaming liquid to a $CO_2$ high-pressure tank through an air pipe, opening a ventilation valve of the $CO_2$ high-pressure tank and adjusting a pressure to 200 kPa;
  after an air in a foaming liquid pipeline is exhausted and the foaming liquid completely enters a water pump, closing the ventilation valve after a pressure and a foaming rate of the foaming device are stable; and
opening a foaming valve, and controlling a pressure range to be within 0.1 to 0.4 mpa, a specific speed of the water pump to be between 20 and 80 and a corresponding water pump flow to be 1 to 4 L/min so as to discharge fine and stable $CO_2$ foam; and receiving the $CO_2$ foam with a container so as to obtain the $CO_2$ bubble cluster.

7. The method according to claim 5, wherein in the Steps S4 and S5, the sample preparation needs to be completed within a half-life of the foaming agent of the $CO_2$ bubble cluster to prevent the foam from bursting to cause leakage of $CO_2$.

* * * * *